(12) United States Patent
Basavapatna et al.

(10) Patent No.: US 8,595,845 B2
(45) Date of Patent: Nov. 26, 2013

(54) CALCULATING QUANTITATIVE ASSET RISK

(75) Inventors: Prasanna Ganapathi Basavapatna, Bangalore (IN); Deepakeshwaran Kolingivadi, San Jose, CA (US); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 27 days.

(21) Appl. No.: 13/354,181

(22) Filed: Jan. 19, 2012

(65) Prior Publication Data
US 2013/0191919 A1 Jul. 25, 2013

(51) Int. Cl.
*G06F 11/00* (2006.01)
(52) U.S. Cl.
USPC ........ 726/25; 726/1; 726/7; 726/11; 713/168; 705/38
(58) Field of Classification Search
USPC ................. 726/1, 7, 11, 25; 713/168; 705/38
See application file for complete search history.

(56) References Cited

U.S. PATENT DOCUMENTS

| | | | | |
|---|---|---|---|---|
| 5,987,610 | A * | 11/1999 | Franczek et al. | 726/24 |
| 6,073,142 | A * | 6/2000 | Geiger et al. | 715/205 |
| 6,460,050 | B1 * | 10/2002 | Pace et al. | 1/1 |
| 7,506,155 | B1 * | 3/2009 | Stewart et al. | 713/152 |
| 2007/0016955 | A1 * | 1/2007 | Goldberg et al. | 726/25 |
| 2007/0067846 | A1 * | 3/2007 | McFarlane et al. | 726/25 |
| 2007/0143851 | A1 * | 6/2007 | Nicodemus et al. | 726/25 |
| 2007/0192236 | A1 * | 8/2007 | Futch et al. | 705/38 |
| 2008/0255898 | A1 * | 10/2008 | Kuroda et al. | 705/7 |
| 2009/0099885 | A1 * | 4/2009 | Sung et al. | 705/7 |
| 2010/0242114 | A1 * | 9/2010 | Bunker et al. | 726/25 |
| 2011/0099375 | A1 * | 4/2011 | Hammes et al. | 713/168 |
| 2012/0233698 | A1 * | 9/2012 | Watters et al. | 726/25 |

OTHER PUBLICATIONS

Information Technology Risk Management, Copyright 2002, © Glen B. Alleman, Niwor, Colorado, 22 pages.
International Search Report and Written Opinion mailed Apr. 5, 2013 for International Application No. PCT/US2012/070207.
Alireza Shameli Sendi, et al., "FEMRA: Fuzzy Expert Model for Risk Assessment," The Fifth International Conference on Internet Monitoring and Protection, IEEE, May 2010, pp. 48-53.

* cited by examiner

*Primary Examiner* — Beemnet Dada
*Assistant Examiner* — Sayed Beheshti Shirazi
(74) *Attorney, Agent, or Firm* — Patent Capital Group

(57) ABSTRACT

A standardized vulnerability score is identified for a particular vulnerability in a plurality of known vulnerabilities, the standardized vulnerability score indicating a relative level of risk associated with the particular vulnerability relative other vulnerabilities. A vulnerability detection score is determined that indicates an estimated probability that a particular asset possess the particular vulnerability and a vulnerability composite score is determined for the particular asset to the particular vulnerability, the vulnerability composite score derived from the standardized vulnerability score and the vulnerability detection score. A countermeasure component score is identified that indicates an estimated probability that a countermeasure will mitigate risk associated with the particular vulnerability on the particular asset. A risk metric for the particular asset and the particular vulnerability is determined from the vulnerability composite score and the countermeasure component score. In some instances, aggregate risk scores can be calculated from a plurality of calculated risk metrics.

26 Claims, 4 Drawing Sheets

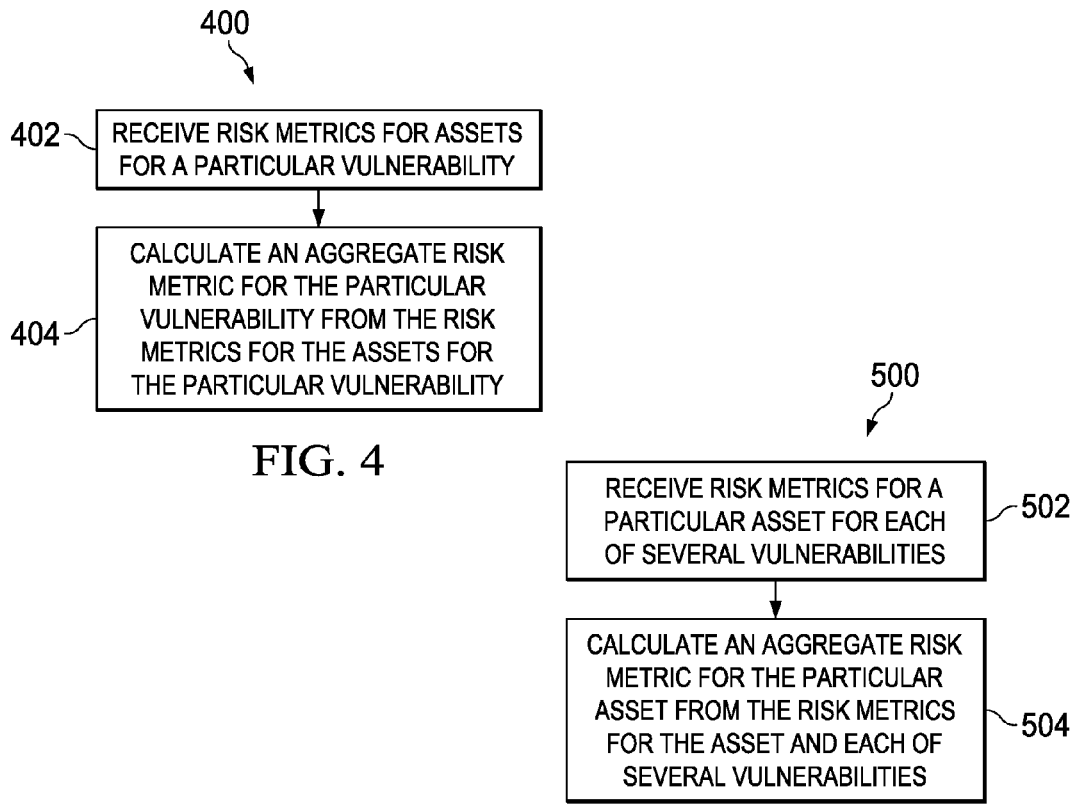

CALCULATING QUANTITATIVE ASSET RISK

TECHNICAL FIELD

This disclosure relates in general to the field of computer security assessment and, more particularly, to calculating risk metrics for assets in a system of computing assets.

BACKGROUND

An asset is a computer or other electronic device. A system of assets can be connected over one or more networks. For example, a home might have five assets, each of which are networked to each other and connected to the outside world through the Internet. As another example, a business might have three physically separate offices, each of which has many assets. The assets within each office and the assets across the offices can be connected over a network.

Each asset in a system of assets can be at risk from multiple threats at any given time. Each threat can correspond to a potential attack on the asset by a particular virus, malware, or other unauthorized entity. An attack occurs when the unauthorized entity exploits a known vulnerability of the asset in an attempt to access or control the asset. Some threats and vulnerabilities have known remediations that, if put in place for an asset, eliminate or reduce the risk that the threat will affect the asset. Some threats do not have known remediations. Further, some known vulnerabilities may not be associated with known threats.

BRIEF DESCRIPTION OF THE DRAWINGS

FIG. 4 is a flow diagram of an example process for aggregating risk metrics for assets on a per-threat or per-vulnerability basis; and FIG. 5 is a flow diagram of an example process for aggregating risk metrics on a per asset basis.

FIG. 6 is an example user interface presenting the top ten most at-risk assets according to the aggregate risk metric for the assets.

Like reference numbers and designations in the various drawings indicate like elements.

DETAILED DESCRIPTION OF EXAMPLE EMBODIMENTS OVERVIEW

Figure 1:
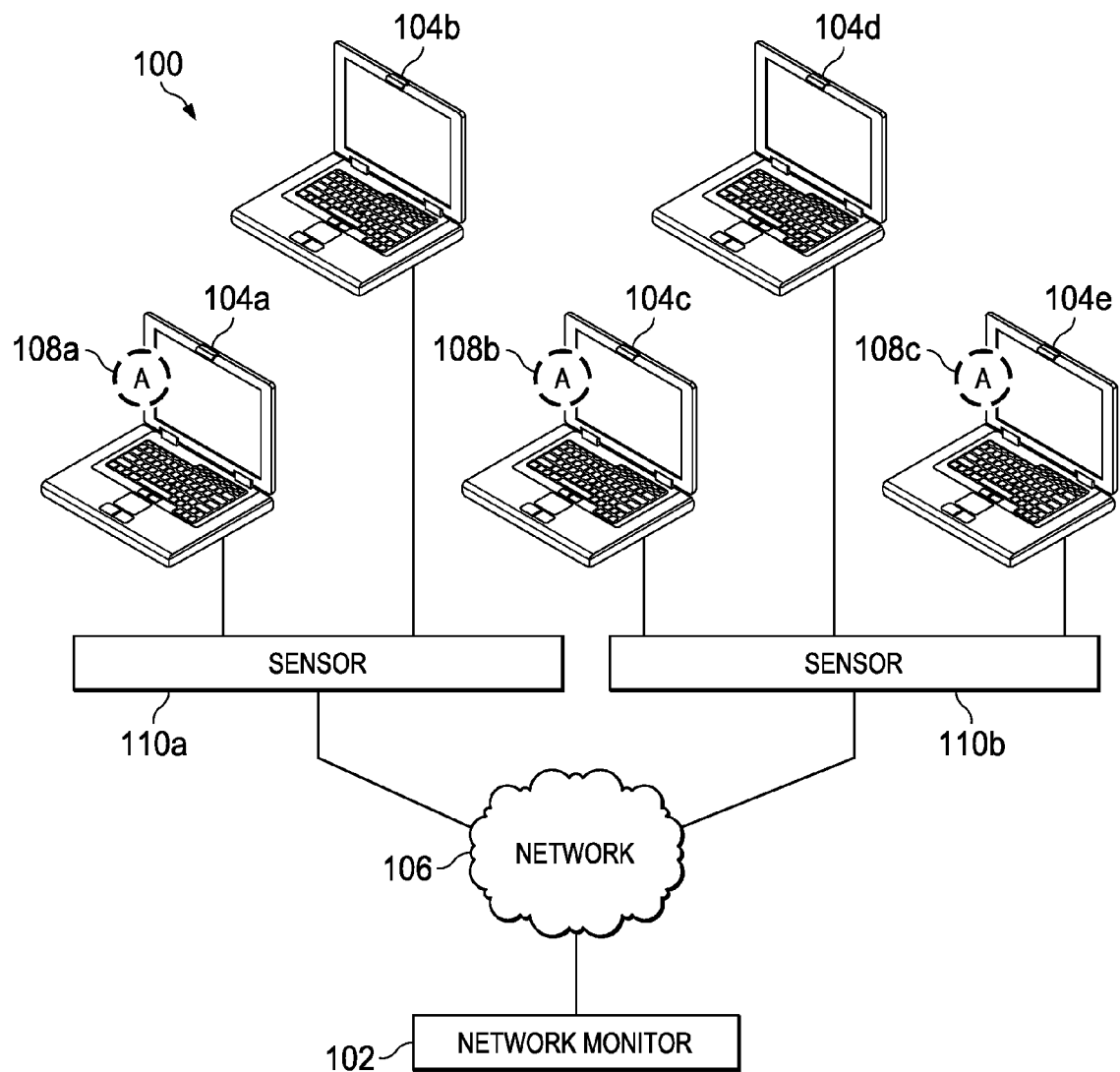
FIG. 1 is a simplified schematic diagram of an example asset system monitored by a network monitor.

In general, one aspect of the subject matter described in this specification can be embodied in methods that include the actions of identifying a standardized vulnerability score for a particular vulnerability in a plurality of known vulnerabilities, the standardized vulnerability score indicating a relative level of risk associated with the particular vulnerability relative other vulnerabilities. A vulnerability detection score can be determined that indicates an estimated probability that a particular asset possess the particular vulnerability and a vulnerability composite score can be determined for the particular asset to the particular vulnerability, the vulnerability composite score derived from the standardized vulnerability score and the vulnerability detection score. A countermeasure component score can be identified that indicates an estimated probability that a countermeasure will mitigate risk associated with the particular vulnerability on the particular asset. A risk metric for the particular asset and the particular vulnerability can be determined from the vulnerability composite score and the countermeasure component score.

Further, in another general aspect, a system can be provided including at least one processor device, at least one memory element, and a network monitor. The network monitor, when executed by the processor, can identify a standardized vulnerability score for a particular vulnerability in a plurality of known vulnerabilities, the standardized vulnerability score indicating a relative level of risk associated with the particular vulnerability relative other vulnerabilities. The network monitor can further determine a vulnerability detection score indicating an estimated probability that a particular asset possess the particular vulnerability, determine a vulnerability composite score for the particular asset to the particular vulnerability derived from the standardized vulnerability score and the vulnerability detection score. Further, the network monitor can identify a countermeasure component score indicating an estimated probability that a countermeasure will mitigate risk associated with the particular vulnerability on the particular asset and determine a risk metric for the particular asset and the particular vulnerability from the vulnerability composite score and the countermeasure component score.

Further, one aspect of the subject matter described in this specification can be embodied in methods that include the actions of receiving vulnerability definition data including, for each of a plurality of vulnerabilities, an indication of the vulnerability, an identification of one or more countermeasures that reduce a risk associated with possession of the vulnerability by an asset, an indication of a level of protection potentially afforded by each countermeasure for the vulnerability, and applicability information describing one or more configurations of assets to which the vulnerability applies. Vulnerability detection data, countermeasure detection data, and configuration data can also be received for each of one or more assets, the vulnerability detection data identifies vulnerabilities applicable to the asset, the countermeasure detection data for each asset identifying one or more countermeasures protecting the asset, and the configuration data for each asset describes a configuration of the asset. A respective risk metric can be determined for each of the one or more assets for each of the one or more vulnerabilities. Determining the risk metric can include, for each asset and each vulnerability: identifying a standardized vulnerability score for the vulnerability, the standardized vulnerability score indicating a relative level of risk associated with the vulnerability relative other vulnerabilities; determining a vulnerability detection score for the asset from the vulnerability detection data for the asset; determining a vulnerability composite score for the particular asset to the particular vulnerability derived from the standardized vulnerability score and the vulnerability detection score; determining a countermeasure component score from the vulnerability definition data and the countermeasure detection data by analyzing the level of protection afforded by each countermeasure identified in both the vulnerability definition data for the vulnerability and in the countermeasure data as protecting the asset; and determining the risk metric for the asset and the vulnerability from the vulnerability composite score and the countermeasure component score.

These and other embodiments can each optionally include one or more of the following features. The standardized vulnerability score can include a standardized component and an environmental component adjusting the standardized component to features of a particular system including the particular asset. The environmental component can represent criticality of the particular asset within the particular system and can be derived based on criticality data information for the particular asset, the criticality information defining an impact of losing the particular asset. Each of the standardized component and environmental component can include data describing a confidentiality impact to assets based on the particular vulnerability, an integrity impact to assets based on the particular vulnerability, and an availability impact to assets based on the particular vulnerability. The standardized component can include a temporal component reflecting changes to risk posed by the particular vulnerability over time. The standardized vulnerability score can be based, at least in part, on the standard score of the Common Vulnerability Scoring System (CVSS). Vulnerability definition data can be received for the particular vulnerability, the vulnerability definition data including an identification of the particular vulnerability, an identification of one or more countermeasures that reduce a risk that the vulnerability will affect an asset, countermeasure protection data indicating a level of protection potentially afforded by each countermeasure for the vulnerability, and applicability data describing one or more configurations of assets to which the vulnerability applies. Vulnerability detection data, countermeasure detection data, and configuration data for the particular asset can also be received; the vulnerability detection data for the particular asset including information suggesting whether the vulnerability is possessed by the particular asset, the countermeasure detection data for the asset identifying one or more countermeasures protecting the particular asset, and the configuration data for the particular asset describing a configuration of the particular asset. The countermeasure component score can be derived from at least the countermeasure protection data and the countermeasure detection data. The countermeasure component score can be further derived from the configuration data for the particular asset. Identifying the countermeasure component score can include calculating the countermeasure component score. The vulnerability detection score can be derived from at least the vulnerability detection data. The vulnerability detection score can be further derived from the configuration data for the particular asset.

Further, embodiments can each optionally include one or more of the following features. The determined risk metric for the particular asset can be a vulnerability-centric risk metric, a threat-centric risk metric can also be determined for the particular asset. Determining a threat-centric risk metric for the particular asset can include: determining a threat factor for the particular asset and particular threat derived from a threat severity score estimating a severity of the particular threat and an applicability score estimating the applicability of the particular threat to the particular asset; determining a threat exposure factor for the particular asset and the particular threat derived from the threat factor, a vulnerability component score, and a threat countermeasure component score, the vulnerability component score indicating whether the particular asset is vulnerable to the particular threat, and the countermeasure component score derived from an estimate of a likelihood that a second countermeasure will mitigate the effect of an attack on the particular asset relating to the particular threat. The threat-centric risk metric for the particular asset and the particular threat can be determined from the threat exposure factor and a criticality score for the particular asset, the criticality score representing an impact of losing the asset. The particular threat can take advantage of the particular vulnerability, the vulnerability component score can be equal to the vulnerability detection score, and the particular countermeasure can be the second countermeasure. Respective calculated values of the determined vulnerability-centric metric and threat-centric metric can be different.

Further, embodiments can each optionally include one or more of the following features. The standardized vulnerability score can have a value within a predefined range. The standardized countermeasure component score can also have a value within a predefined range. At least some vulnerabilities in the plurality of known vulnerabilities may be associated with at least one in a plurality of known threats, while the particular vulnerability is not associated with any of the known threats. A respective risk metric can be determined for the asset and each of the plurality of vulnerabilities and an aggregate risk metric can be determined for the asset from the respective risk metrics for the asset and each of the plurality of vulnerabilities. The aggregate risk metric can be one of: a sum of the respective risk metrics, a mean of the respective risk metrics, a maximum of the respective risk metrics, a minimum of the respective risk metrics, or a mode of the respective risk metrics. A group of assets including the particular asset can be selected and an aggregate risk metric can be determined for each asset in the group to then determine an aggregate risk metric for the group of assets from the assets' respective aggregate risk metrics. In other instances, a respective risk metric can be determined for each of a plurality of assets and the vulnerability and an aggregate risk metric can be determined for the vulnerability from the respective risk metrics for each of the plurality of assets and the vulnerability.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

EXAMPLE EMBODIMENTS

§1.0 Asset System Overview

FIG. 1 illustrates an example asset system 100 monitored by a network monitor 102. The assets 104 in the system 100 are connected to each other, and optionally to other systems, by a network 106.

Each asset 104 can be vulnerable to one or more threats. These threats include, for example, viruses, malware, and other software or agents that cause unauthorized attacks. Each asset can be protected by a variety of countermeasures. These countermeasures include passive countermeasures and active countermeasures.

Active countermeasures can be countermeasures that eliminate, in whole or in part, the existence of the vulnerability. For example, applying a patch to a vulnerable application or OS component removes the vulnerability. Similarly, reconfiguring may eliminate a vulnerability in the case where a browser setting is too loose, or a password is too short (and you create a new, stronger password). Other active countermeasures include uninstalling vulnerable applications, turning off vulnerable services, and even turning off vulnerable machines or unplugging their network cables.

Passive countermeasures cover up the existence of the vulnerability to shield it from exploitation (e.g., by a threat). For example, a passive countermeasure can include leveraging a firewall to protect a port that is being listened to by an application that is vulnerable, or activating a host intrusion protection system (HIPS) to detect signatures that attempt to exploit a buffer overflow on a vulnerable piece of code in an application or operating system component. Active and passive countermeasures can be network- or host-based and may be sensor-related (such as antivirus or HIPS), or configured as shields for the host (such as network or host firewall, proxy server, packet filter, etc). Passive countermeasures generally protect the host until vulnerabilities can have active countermeasures applied, or to protect against unknown vulnerabilities.

Passive countermeasures can be provided by two kinds of sensors: host-based sensors 108 and network-based sensors 110. The host-based sensors 108 and the network based sensors 110 monitor the assets themselves and/or network traffic to and from the assets. For illustrative purposes, the sensors are described below as both monitoring the assets and protecting the assets by providing one or more countermeasures. However, the monitoring and countermeasure functionalities do not have to be provided by the same sensor. In the description below, sensor is used to refer to various types of monitoring and protection systems including, for example, firewalls, host intrusion prevention systems, network intrusion prevention systems, network access control systems, intrusion detection systems, anti-virus software, and spam filters.

The host-based sensors 108 and the network-based sensors 110 can include one or more passive countermeasures that are part of the sensor. These passive countermeasures are software programs and/or hardware that protect assets from various threats. Each passive countermeasure reduces the risk that a threat will affect an asset. A passive countermeasure protects against a threat by detecting and stopping an attack associated with the threat, by detecting and stopping activities associated with the attack, or by mitigating damage caused by an attack. For example, a passive countermeasure may be configured to detect data having a signature associated with a particular attack, and block data with that signature. As another example, a passive countermeasure may generate back-up copies of particular files targeted by an attack, so that even if the attack attacks the files, the files can be restored. Example passive countermeasures include, but are not limited to, hardware firewalls, software firewalls, data loss prevention systems, web proxies, mail filters, host-based intrusion prevention systems, network-based intrusion prevention systems, rate-based intrusion prevention systems, content-based intrusion prevention systems, intrusion detection systems, and virus detection software.

Passive countermeasures can also be partial countermeasures that do not completely protect from or mitigate the effects of an attack. For example, a partial passive countermeasure might block some, but not all, of the network traffic associated with a particular attack. As another example, if a threat needs either direct physical access or network access to compromise an asset, an example partial passive countermeasure would block network access to the asset, but not physical access.

The host-based sensors 108 can include agent-based or otherwise software-based sensors that are installed on respective assets 104. For example, host-based sensor 108a is installed on asset 104a, host-based sensor 108b is installed on asset 104c, and host-based sensor 108c is installed on asset 104e. The host-based sensors 108 run various analyses on their respective assets 104, for example, to identify vulnerabilities on the assets 104 or to identify viruses or other malware executing on the assets 104. The host-based sensors may also provide one or more passive countermeasures for threats, as described above. Example host-based sensors can include antivirus and other antimalware software.

The network-based sensors 110 are hardware devices and/or software in a data communication path between assets 104 protected by the sensor and the network resources that the asset is attempting to access. For example, sensor 110a is connected to assets 104a and 104b, and sensor 110b is connected to assets 104c, 104d, and 104e. While FIG. 1 illustrates a single network-based sensor 110 in a communication path with each asset, other configurations are possible. For example, multiple network-based sensors 110 can be connected to the same asset 104, and some assets 104 may not be connected to any network-based sensors 110.

When an asset 104 tries to send information through the network 106 or receive information over the network 106 through a network-based sensor 110, the sensor analyzes information about the asset 104 and the information being sent or received and determines whether to allow the communication. An example network-based sensor includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a sensor control system (not shown) and take further actions as instructed by the sensor control system 102. Example network-based sensors include network access control systems, firewalls, routers, switches, bridges, hubs, web proxies, application proxies, gateways, network access control systems, mail filters, virtual private networks, intrusion prevention systems and intrusion detection systems.

The assets 104 can also be protected by one or more active countermeasures that are applied to the asset. Active countermeasures make changes to the configuration of assets or the configuration of existing passive countermeasures to actively eliminate a vulnerability. In contrast, passive countermeasures hide the effects of a vulnerability, but do not remove the vulnerability. Each active countermeasure eliminates, or at least reduces, the risk that a threat will affect an asset when the active countermeasure is applied to the asset by eliminating, or at least reducing, a vulnerability. An active countermeasure protects against a threat by modifying the configuration of an asset 104 so that the asset is no longer vulnerable to the threat. For example, an active countermeasure can close a back door that was open on an asset or correct another type of system vulnerability. Example active countermeasures include, but are not limited to, software patches that are applied to assets.

The assets 104 may be vulnerable to many different threats at any given time. Some of the assets 104 may be already protected by one or more passive countermeasures, and some of the assets 104 may need to have additional countermeasures put in place to protect the assets from the threats. Therefore, it is helpful to determine a risk metric for each asset and each threat. The risk metric is a quantitative measure of the risk that a threat poses to an asset, both in terms of the probability that the threat will affect the asset and the magnitude of the effect that the threat will cause.

The network monitor 102 can include one or more computers, each of which includes one or more processors (e.g., 112), a memory subsystem (e.g., 114), and an input/output subsystem (e.g., 116). The network monitor 102 is programmed to process data about potential threats on the network, as well as countermeasures provided by the sensors and vulnerabilities of the assets, in order to generate risk metrics for assets and threats. The network monitor 102 can also aggregate risk metrics across the system. In some instances, portions of the network monitor 102, and/or functionality of the network monitor 102, can be implemented and performed using one or more host-based monitors resident on one or more of the assets 104 themselves. Such host-based monitors can include, for example, Risk metrics, and example techniques for generating and aggregating risk metrics, are described in more detail below.

§2.0 Example Data Sources for Risk Metric Generation

The network monitor 102 receives data from several sources in order to determine a risk metric for a given asset and a given threat and/or vulnerability. Generally, a threat can include something that is a source of danger to an asset or system. Vulnerabilities include weaknesses within the asset or system that can be exploited to do harm to the asset or system. Threats leverage one or more vulnerabilities to do harm to the asset or system. In other words, every threat takes advantage of one or more known vulnerabilities. Vulnerabilities, on the other hand, can exist in the absence of a known or defined threat and can still represent risk facing the asset or system.

Figure 2:
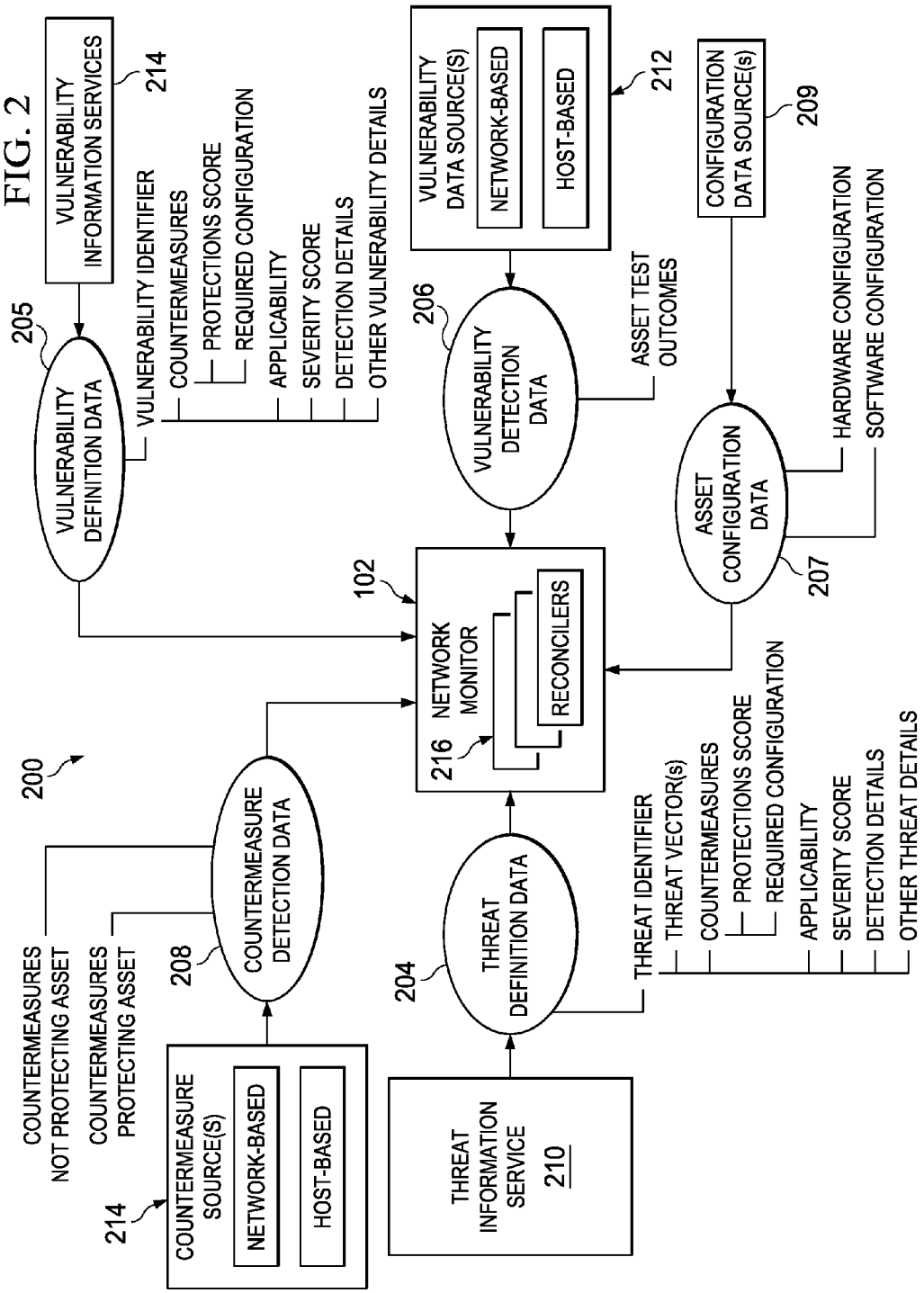
FIG. 2 is a simplified block diagram of an example of the sources of data used by a network monitor.

FIG. 2 illustrates an example of the sources of data used by a network monitor 102. The network monitor 102 receives one or more of threat definition data 204, vulnerability definition data 205, vulnerability detection data 206, asset configuration data 207, and countermeasure detection data 208. The threat definition data describes identified threats, what countermeasures (if any) protect assets from the threats, and the severity of the threat. The vulnerability definition data 205 similarly describes identified vulnerabilities, countermeasures that mitigate risk associated with the vulnerabilities (or resolve the vulnerability), and the severity of the vulnerability. In some cases, vulnerability definition data 205 can include standardized vulnerability scores representing an industry standard, or other collaborative assessment of the relative severity of known vulnerabilities. The vulnerability detection data 206 specifies, for each asset and for each threat, whether the asset is vulnerable to the threat, not vulnerable to the threat, or of unknown vulnerability. The configuration data 207 specifies, for each asset, details of the configuration of the asset. The countermeasure detection data 208 specifies, for each asset, what countermeasures are protecting the asset.

§2.1.1 Asset Configuration Data

The asset configuration data 207 is received from one or more configuration data source(s) 209. In some implementations, the configuration data source(s) 209 are one or more data aggregators. A data aggregator is one or more servers that receive configuration data, aggregate the data, and format the data in a format useable by the network monitor 102. The data aggregators can receive configuration data from the assets themselves or from the sensors monitoring the assets. Example data aggregators include McAfee ePolicy Orchestrator®, available from McAfee of Santa Clara, Calif., and Active Directory®, available from Microsoft Corporation of Redmond, Wash. For example, a data aggregator can maintain an asset data repository with details on asset configurations. Alternatively, the configuration data source(s) 209 are the assets and/or sensors themselves. When the configuration data source(s) 209 are the assets and/or sensors themselves, the configuration data can be delivered directly to the network monitor 102, in some cases, for aggregation at the network monitor 102 (rather than the assets and/or sensors themselves).

The configuration of an asset is a hardware and/or software configuration. Depending on the configuration, various vulnerabilities and/or threats may be applicable to an asset. In general, the configuration of the asset can include one or more of the physical configuration of the asset, the software running on the asset, and the configuration of the software running on the asset. Examples of configurations include particular families of operating systems (e.g., Windows™, Linux™, Apple OS™), specific versions of operating systems (e.g., Windows Vista™), particular network port settings (e.g., network port 8 is open), and particular software products executing on the system (e.g., a particular word processor or a particular web server). In some implementations, the configuration data does not include countermeasures in place for the asset, or whether the asset is vulnerable to a particular threat.

§2.1.2 Threat Definition Data

The threat definition data 204 is received from a threat information service 210 and can be referred to as a "threat feed." The threat information service 210 identifies threats and countermeasures that protect against the threats, and then provides the data to the network monitor 102. In some implementations, the threat information service 210 can provide a threat feed with the threat definition data to the network monitor 102 through a network. The threat feed can be, for example, threat definition data sent over the network either as needed, or according to a predefined schedule.

The threat definition data 204 identifies one or more threats. The threat definition data 204 can further specify one or more threat vectors for each threat. Each threat vector represents a vulnerability exploited by the threat and how the vulnerability is exploited, e.g., represents a particular attack associated with the threat. In some implementations, multiple threat vectors for a threat are aggregated into a single threat vector representing the entire threat. In other implementations, the individual threat vectors for a threat are separately maintained. As used herein, threat means either an attack represented by a single threat vector, or an overall threat represented by one or more threat vectors.

Further, while threats can exploit multiple known vulnerabilities, it is possible that some known vulnerabilities, while inherently opening an asset to potential threat, are not known to be able to be exploited by a particular, actual or known threat. In other words, not all vulnerabilities may be associated or matched to a particular threat. Indeed, in some systems, the listing of known vulnerabilities may exponentially outnumber a listing of known threats, thereby increasing the likelihood that some, or even many, of the known vulnerabilities are not associated with particular threats.

The threat definition data 204 further specifies, for each threat, the countermeasures that protect against the threat and a protection score for each countermeasure. In general, the protection score estimates the effect that the countermeasure has on mitigating the threat. The protection score for each countermeasure has a value in a predetermined range. Values at one end of the range (e.g., the low end) indicate that the countermeasure provides a low level of mitigation. Values at the other end of the range (e.g., the high end) indicate that the countermeasure provides a high level of mitigation.

Consider an example where the protection scores range from zero to one-hundred. The information service 210 can define the protection scores as follows. A countermeasure has a protection score of zero for a threat when the countermeasure does not cover the threat, the threat is out of the scope of the countermeasure, the coverage of the countermeasure is pending, the coverage of the countermeasure is undermined by something else executing on the asset, when coverage is not warranted, or when the coverage of the countermeasure is under analysis. A countermeasure has a protection score of 50 when the countermeasure provides partial coverage for the asset. Partial countermeasures that provide partial coverage for the asset are described in more detail below with reference to §2.1.4. A countermeasure has a protection score of 100 when the countermeasure is expected to, or actually does, provide full coverage from the threat. Other scales, and other discretizations of the protection score can alternatively be used.

The data specifying the countermeasures that mitigate the effect of a threat can also include required system settings for the particular configurations of the countermeasures. For example, these settings can include a version of a signature file that must be used by a software product, or can include a product identifier, a product version identifier, and data describing other settings of the software product. The data can also identify some of the countermeasures as partial countermeasures. In some implementations, the threat definition data 204 also includes a countermeasure confidence score for each countermeasure that protects against the threat. The confidence score is an estimate of how likely the countermeasure is to reduce the risk that the threat or the threat vector will affect the asset. The threat definition data 204 also includes applicability data for each threat. The applicability data specifies a configuration that an asset must have in order to be vulnerable to the threat. For example, the applicability data can specify that the threat only attacks particular operating systems or particular software products installed on an asset, or that the threat only attacks particular versions of products, or products configured in a particular way.

The threat definition data 204 can also include a severity score for the threat. The severity score is an estimate of how severe an attack by the threat would be for an asset, and may optionally also estimate how likely the threat is to affect assets. The severity score can be calculated according to multiple factors including, for example, a measure of how a vulnerability is exploited by a threat; the complexity of an attack once the threat has gained access to the target system; a measure of the number of authentication challenges typically determined during an attack by a threat; an impact on confidentiality of a successfully exploited vulnerability targeted by the threat; the impact to the integrity of a system of a successfully exploited vulnerability targeted by the threat; and the impact to availability of a successfully exploited vulnerability targeted by the threat. The severity score can be specified by a third party or determined by the information source.

In some implementations, the threat definition data 204 also specifies which sensors and/or which software products executing on the sensors can detect an attack corresponding to the threat. For example, suppose threat A can attack all machines on a network with a specific vulnerability and that product B can detect the vulnerability when it has setting C. In some instances, a "setting" can include a test, such as a test script or other executable file/application which tests the existence of the vulnerability. Furthermore, product D provides passive countermeasures that mitigate the effect of the threat. In this case, the threat definition data can specify that threat A attacks all machines, that product B with setting C can detect the vulnerability to the threat, and that product D provides passive countermeasures that protect against the threat. In some examples, a product E, such as a patch, can provide an active countermeasure to eliminate the threat. Generally, such countermeasure attributes can be defined in threat definition data 204.

The threat definition data 204 can also optionally include other details for the threat, for example, whether the existence of the threat has been made public, who made the existence of the threat public (e.g., was it the vendor of the software that has been compromised?), a web address for a public disclosure of the threat, and one or more attack vectors for the threat. The attack vectors can be used to determine what passive countermeasures are protecting the asset from the threat at a given time.

The threat definition data may also include other information about the threat, for example, a brief description of the threat, a name of the threat, an estimate of the importance of the threat, an identifier of the vendor(s) whose products are attacked by the threat, and recommendations on how to mitigate or eliminate the effects of the threat.

In some implementations, the threat definition data has a hierarchical structure (e.g., multiple tiers). For example, the first tier can include a general identification of the products that are vulnerable to the threat such as the name of a software vendor or the name of a particular product vulnerable to the threat. Additional tiers can include additional details on needed configurations of the assets or other details of the threat, for example, particular product versions or settings including the applicability data described above.

§2.1.3 Vulnerability Definition Data

The vulnerability definition data 205 is received from one or more vulnerability information services 213. A vulnerability information service 21s identifies vulnerabilities and countermeasures that protect against the vulnerabilities, and then provides the data to the network monitor 102. In some implementations, the vulnerability information service 213 can be combined with threat information service 210 to provide both vulnerability definition data 205 and threat definition data 204 for use by the network monitor 102 (or by host-based components and risk assessment tools). Vulnerability definition data can be sent over the network either as needed, or according to a predefined schedule.

The vulnerability definition data 205 identifies one or more vulnerabilities. As noted above, vulnerabilities can be associated with known threats (and corresponding threat definition data 204) by virtue of an identification that a particular threat exploits a particular vulnerability. Such relationships can be specified in one or more threat vectors and may be further linked to or identified within the vulnerability definition data 205. In some implementations, relationships between vulnerabilities and threats can be further or separately defined in correlation data (not shown in FIG. 2). Further, vulnerability definition data 205 can specify, for each vulnerability, the countermeasures that protect against the vulnerability and a protection score for each countermeasure. In general, the protection score estimates the effect that the countermeasure has on mitigating risk associated with the vulnerability. The protection score for each countermeasure can have a value in a predetermined range. Values at one end of the range (e.g., the low end) indicate that the countermeasure provides a low level of mitigation. Values at the other end of the range (e.g., the high end) indicate that the countermeasure provides a high level of mitigation.

The data specifying the countermeasures that mitigate the effect of a vulnerability can also include system settings for the particular configurations of the countermeasures. For example, these settings can include a version of a signature file that must be used by a software product, or can include a product identifier, a product version identifier, and data describing other settings of the software product. In other instances, settings can specify a correct, improved, or optimized configuration for an asset, such as a configuration that would overcome the identified vulnerability. For instance, a misconfiguration of a web browser can be identified as a vulnerability that can be exploited via visiting a malicious website, while reconfiguring the browser (manually or automatically) may fully remedy the misconfiguration and eliminate the vulnerability, as but one example. The data can also identify some of the countermeasures as partial countermeasures. In some implementations, the vulnerability definition data 205 also includes a countermeasure confidence score for each countermeasure that protects against risk associated with a vulnerability. The confidence score is an estimate of how likely the countermeasure is to reduce the risk associated with the vulnerability. The vulnerability definition data 205 can also include applicability data for each vulnerability. The applicability data specifies asset configurations associated with presence of the vulnerability on the asset. For example, the applicability data can specify certain operating systems, patch versions, peripheral devices, software application versions, application settings, plug-ins, etc. known to introduce the vulnerability onto the asset. Further, applicability data can be used in connection with asset configuration data 207 to detect vulnerabilities on particular assets and generate corresponding vulnerability detection data 206 reporting the discovery of such vulnerabilities.

Protection scores included in vulnerability definition data 205 can be associated with or otherwise relate to protection scores included for the same countermeasures in threat definition data 204 discussed above. In some instances, a given countermeasure can be considered to mitigate against both the risk associated with a vulnerability as well as risk associated with threats exploiting the vulnerability. In some instances, the risk associated with a vulnerability can be dependent on the severity of the threats that can leverage the vulnerability. Indeed, in some implementations, protection scores can be constant for a particular countermeasure relative a particular vulnerability/threat combination. For instance, a value of a given protection score for a particular countermeasure can be the same within both a vulnerability-centric and a threat-centric risk assessment considering the particular countermeasure. In other instances, the protection score included in the vulnerability definition data 205 for a particular vulnerability can be different from the protection score included in threat definition data 204 for a related threat. Such differences can reflect, for instance, the ability of a countermeasure to mitigate against not only the risk attributed to one particular related threat associated with a particular vulnerability, but also other known threats associated with the particular vulnerability (such as when a vulnerability exposes an asset to and is related to multiple different known threats), and other anticipated or predicted (but unknown) threats that could potentially exploit the particular vulnerability beyond the particular threat. Protection scores with vulnerability definition data 205 can also differ in value from protection scores for the same countermeasure included in threat definition data 204, based on the varied uses of vulnerability definition data 205 and threat definition data 204. For instance, the scale, score range, etc. adopted for each protection score can be optimized based on the types of risk metric formulas and calculation techniques that will make use of the respective vulnerability definition data 205 and threat definition data 204. For example, vulnerability definition data 205 (and its constituent scores and values) can be optimized for vulnerability-centric analyses and formulas, while threat definition data 204 is optimized for threat-centric analyses and formulas.

As with threat definition data 204, vulnerability detection data 206 can also include a measure of the severity of a corresponding vulnerability. In some instances, threat definition data 204 can include standardized vulnerability severity scores. Such standardized severity scores, such as the Common Vulnerability Scoring System (CVSS), SANS vulnerability analysis scale, CERT/CC vulnerability scores, and others, can be used in connection with the determination of particular risk metrics. Standardized severity scores can leverage intelligence from system security experts throughout an enterprise, industry, or standards-setting organization to gain access to and utilize knowledge concerning tens of thousands of detected, identified, resolved, tested, and otherwise known vulnerabilities. A standardized security score can include severity scores for each of thousands of catalogued vulnerabilities. The security scores can be standardized for comparison across the catalog of vulnerabilities, allowing the severity of particular vulnerabilities, even affecting very different assets, to be compared, if both of the vulnerabilities were to be identified in a generic system. In some instances, standardized vulnerability severity scores can be customized or adjusted to reflect varying realities within an environment (i.e., "temporal" considerations) as well as the unique issues and configurations of a particular, real-world environment (i.e., "environmental" considerations). Environmental considerations can be driven, and in some cases calculated, based on other information in vulnerability definition data 205 (such as additional, system-specific vulnerability severity data or other non-public information), asset configuration data 207, or other data and information available to vulnerability information service 213.

In one example, standardized vulnerability scores, representing risk and the severity of risks associated with a vulnerability, can consider multiple factors. For instance, a standardized vulnerability score can consider the various impacts and types of impacts a particular vulnerability might expose an asset to. For instance, a severity score can be based on a confidentiality impact (e.g., relating to restricting access to particular data and assets to authorized users), integrity impact (e.g., relating to protecting the veracity and trustworthiness of information accessed or received by assets or using particular assets), and availability impact (e.g., relating to the accessibility of information in a system) of a particular vulnerability. Similarly, in such an example, environmental factors could similarly address the relative importance (and thereby vulnerability) of particular assets and subsystems from a confidentiality, integrity, and availability standpoint. For instance, CVSS provides for a standardized severity score that incorporates a base score B (determined from combined consideration of confidentiality, integrity, and availability impacts) for a vulnerability within a generic system, a temporal adjustment factor $X_T$ (to optionally consider temporal factors influencing a vulnerability's severity within a generic system), and environmental factors such as collateral damage potential factor $X_{CDP}$ (measuring the system-specific potential collateral damage to life or property introduced by a vulnerability), target distribution factor $X_{TD}$ (measuring an estimated percentage of assets affected by a vulnerability), and an impact factor $X_{CIA}$ (incorporating environment- or asset-specific adjustments to the confidentiality, integrity, and availability impacts utilized to compute the base score B). Accordingly, a CVSS standardized vulnerability severity score can be:

$$V_{CVSS} = BX_T(X_{CDP}X_{TD}X_{CIA}).$$

§2.1.4 Vulnerability Detection Data

The vulnerability detection data 206 is received from one or more vulnerability data source(s) 212. In some implementations, the vulnerability data source(s) 212 are one or more data aggregators. The data aggregators receive vulnerability detection data from individual sensors in the system. The individual sensors can be host-based sensors and/or network-based sensors. A data aggregator is one or more servers that receive configuration data (e.g., 207), aggregate the data, and format it in a format useable by the network monitor 102. The data aggregators can be the same as, or different from, the data aggregators that are the configuration data source(s) 209. The data aggregators can receive vulnerability detection data from the assets themselves or from the sensors monitoring the assets. Further, data aggregators can access and utilize asset configuration data 207 to identify that a vulnerability is likely relevant to, or possessed by, a particular asset. An example data aggregator is McAfee ePolicy Orchestrator®, available from McAfee® of Santa Clara, Calif. Alternatively, the vulnerability data source(s) 212 can be the assets and/or sensors themselves. When the vulnerability data source(s) 212 are the assets and/or sensors themselves, the vulnerability detection data is not aggregated when it is received by the network monitor 102, and the network monitor 102 aggregates the detection data itself.

The vulnerability detection data 206 for a given asset specifies what tests were run by sensors protecting the asset, as well as the outcome of those tests. Example tests include virus scans, vulnerability analyses, system configuration checks, policy compliance checks, network traffic checks (e.g., provided by a firewall, a network intrusion detection system, or a network intrusion prevention system), and tests performed by host-based intrusion prevention systems or host-based intrusion detection systems. The vulnerability detection data 206 allows the network monitor 102 to determine, in some cases, that an asset has one or more vulnerabilities, and to determine, in other cases, that the asset does not have particular vulnerabilities.

Vulnerability detection data 206 can be generated by collecting, considering, and comparing asset configuration data 207 and vulnerability definition data 205. The applicability of a given vulnerability to a particular asset can be determined, for instance, based on configuration data for a given asset. When information in vulnerability definition data 205 describing asset characteristics and configurations evidencing or causing the vulnerability substantially matches or approximates asset configuration data, vulnerability data sources 212 (or network monitor 202 itself) can determine that the vulnerability is applicable to the asset. Vulnerability detection data can also indicate the probability that a vulnerability is possessed by an asset. For instance, it can be affirmatively determined that a vulnerability is possessed by an asset when the vulnerability definition data for the vulnerability specifies a configuration that exactly matches the configuration of the asset. In other implementations, the process 300 determines that a vulnerability is applicable to an asset when the configuration specified by the applicability data only partially matches the configuration of the asset. The configuration specified by the applicability data partially matches the configuration of the asset when some aspect of the configuration specified in the applicability data matches the configuration data for the asset, but some other aspect does not. In such instances, vulnerability detection data 206 can indicate the probability that the asset does or does not possess the vulnerability. For example, it can be determined that a vulnerability definition partially matches the configuration of an asset when the operating system possessing the vulnerability and the operating system running on the asset are in the same family, but not identical operating systems (e.g., different versions, patches, service packs, etc.). In another example, identifying that a particular asset has an installed or running version of a particular software product can be interpreted to mean that the asset is vulnerable to particular vulnerabilities known to exist on or that are attributable to the particular version of the product.

Multiple sensors may test for the same vulnerability. In that case, the vulnerability detection data 206 can include the outcome of all of the tests for the vulnerability (optionally normalized, as described below). Alternatively, the vulnerability detection data 206 may include the outcome for only a single test, for example, a test that found the asset vulnerable or a test that found the asset not vulnerable.

In some implementations, when an asset may have a vulnerability that has been corrected by an active countermeasure, for example, a software patch, the tests will indicate that the asset is not vulnerable to the threat, as the countermeasure has stopped the vulnerability.

§2.1.5 Countermeasure Detection Data

The countermeasure detection data 208 is received from countermeasure source(s) 214. In general, the countermeasure detection data 208 specifies, for a given asset, what countermeasures are in place to protect the asset. In some implementations, the countermeasure detection data 208 also specifies what countermeasures are not protecting the asset. A countermeasure is not protecting an asset, for example, when it is not in place at all, or when it is in place to protect the asset but it or the asset is not properly configured. Accordingly, in some instances, the detection and assessment of deployed countermeasures and generation of countermeasure detection data 208 can include the consideration of asset configuration data 207.

The countermeasure source(s) 214 are sources that store the settings of individual sensors in the network, as well as data specifying which assets are protected by which sensors. For example, the countermeasure source(s) 214 can be one or more computers that receive data about the protection provided by sensors in the network and data about which sensors protect which assets. The countermeasure source(s) 214 aggregate the data to determine which countermeasures are in place to protect each asset. An example countermeasure data source is McAfee ePolicy Orchestrator®, available from McAfee® of Santa Clara, Calif. Example settings include an identification of the product providing the countermeasure, a product version, and product settings. Other example settings include one or more signatures of threats (e.g., file signatures or network traffic signatures) that are blocked by the countermeasure.

Countermeasures can be provided by the network-based sensors in the network, the host-based sensors in the network or both. When a countermeasure is provided by an host-based sensor running on the asset, it is clear that the countermeasure is protecting the asset. However, network-based countermeasures are remote from the assets they are protecting. Therefore, additional data is needed to associate network-based passive countermeasures with the assets they protect. The countermeasure source(s) 214 must first determine which assets are monitored by which network-based sensors, and then associate, for each sensor, the passive countermeasures provided by the sensor with each of the assets monitored by the sensor. Users can manually associate the assets with the sensors, or the assets can be automatically associated with the sensors.

In some implementations, users manually associate assets with sensors through various user interfaces. For example, one user interface allows users to manually specify the identity of each asset protected by each sensor in the network. Alternatively, users can be presented with a user interface that allows them to specify a series of rules for associating assets with sensors. The rules can be based, for example, on Internet Protocol (IP) address ranges, nodes through which assets connect to the network, Media Access Control (MAC) address ranges, NetBIOS names of assets, or other user-specified categories, such as groups of assets defined by users or properties of assets tagged by users.

In other implementations, the countermeasure source(s) 214 can automatically correlate sensors with assets based on alerts received from the sensors. Each alert identifies an attack on an asset that was detected by the sensor. For example, when a sensor detects an attack on a particular IP address, the countermeasure source(s) 214 can determine that the sensor is protecting an asset with that particular IP address.

In some implementations, the data associating sensors with assets can associate a sub-part of the sensor with the asset, when that sub-part protects the asset. For example, if a particular port on a network-based sensor, or a particular software program running on a sensor, protects an asset, the association can further specify the port or software program.

§2.1.6 Normalizing and Reconciling the Data

The data described above is received from different sources and is not necessarily in the same format. For example, each source can identify threats, countermeasures, and assets using different naming conventions. Therefore, the network monitor 102 may have to normalize the data before it can be used. The network monitor 102 normalizes the data by using source-specific reconcilers 216 that format the data received from a given source into a standard format. For example, an enterprise may receive data from two products, product A and product B. Product A may provide the data in one format, and product B may provide the data in a different format. The network monitor 102 uses a reconciler specific to product A to translate the data from Product A into a format that can be used by the network monitor 102. Similarly, the network monitor 102 uses a reconciler specific to product B to translate the data from product B into a format that can be used by the network monitor 102. Each source-specific reconciler can be, for example, one or more computers or one or more software programs on one or more computers. Each source-specific reconciler 216 translates the data, for example, using a corresponding table that maps identifiers used by the specific source to identifiers used by the network monitor 102.

§3.0 Example Process for Risk Metric Generation

Risk metrics can be generated to illustrate or assess the risk evident in particular assets by virtue of the asset's exposure to a particular vulnerability and thereby also, in some instances, an associated threat known to exploit the particular vulnerability. Generally, in modern systems, the number of known vulnerabilities greatly outnumbers the known threats that exploit these vulnerabilities. In some systems, the number of identified, verified, catalogued, or otherwise known system vulnerabilities can be in excess of 30,000 or more, while the number of known threats exploiting these vulnerabilities can be in the range of 5,000 or more. Further, while some system administrators are comfortable with and manage systems on the basis of threats (e.g., employing threat-centric risk analyses), other administrators may find that a vulnerability-centric approach is useful, either to supplement or replace threat-centric risk analyses. Further, in some instances, threat-centric risk analyses may not suitably consider all of the risk present on assets, given that some threats have not been mapped to or been identified as exploiting the variety of system vulnerabilities known to potential exist within particular system assets. As a result, risk metrics can be calculated using either or both of threat-centric and vulnerability-centric techniques.

§3.1 Example Process for Threat-Based Risk Metric Generation

Figure 3A:
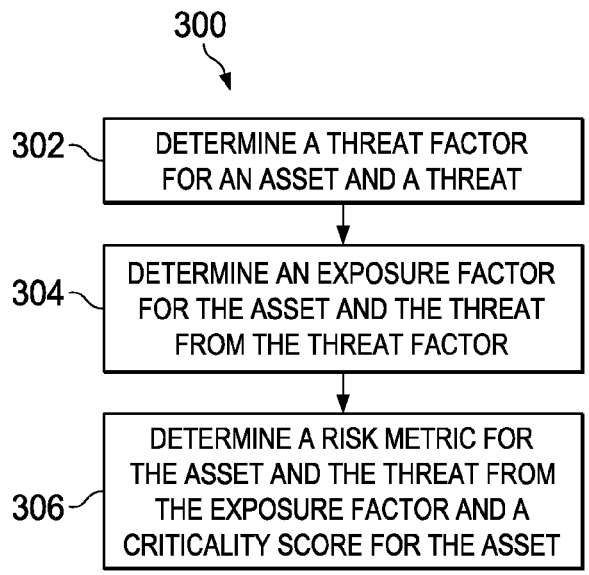
FIG. 3A is a flow diagram of an example process for generating a threat-centric risk metric for an asset and a threat.

FIG. 3A is a flow diagram of an example process 300 for generating a threat-centric risk metric for an asset and a threat. As used herein, the threat can be a particular attack represented by an individual threat vector for a threat, or can be the threat as a whole. The process can be implemented, for example, by the network monitor 102.

The process 300 determines a threat factor T for an asset and a threat (302). The threat factor is derived from a threat severity score $T_S$ for the threat and applicability score $A_P$ for the threat.

In some implementations, the system determines the threat factor for an asset and a threat as follows. The system determines the threat severity score $T_S$ for the threat, determines the applicability score $A_P$ for the threat, and multiplies the threat severity score by the applicability score, e.g.,: $T = T_S A$.

The threat severity score $T_S$ is specified in the threat definition data 204 described above with reference to FIG. 2. In general, the threat severity score $T_S$ has a value in a predetermined range of values. For example, the threat severity score $T_S$ can have a value between 0.0 and 10.0, in 0.1 increments. In some implementations, when the threat is represented by multiple threat vectors, each threat vector can have an individual severity score. In these implementations, the process 300 can derive the threat severity score from the individual severity scores. For example, the process 300 can use the maximum individual threat severity score, or the average individual threat severity score, as the threat severity score.

The applicability score $A_P$ for an asset has a first value (e.g., one) when a threat is applicable to an asset, and has a second value (e.g., zero) when the threat is not applicable to the asset. A threat is applicable to an asset when the asset is running software that is of a type that can have a vulnerability that is exploited by the threat or when the asset contains hardware that can have a vulnerability that is exploited by the threat. For example, if a particular operating system has a known vulnerability that is exploited by a threat, and an asset is running that operating system, the threat is applicable to the asset. This is true regardless of whether the operating system on the asset has the vulnerability, or has been remediated to remove the vulnerability.

The process 300 compares applicability data for a given threat to configuration data for a given asset to determine whether the given threat is applicable to the given asset. The applicability data and configuration data are described in more detail above, with reference to FIG. 2. When the applicability data matches the configuration data, the process 300 determines that the threat is applicable to the asset, and therefore the applicability score is the first value (e.g., one). Conversely, when the applicability data does not match the configuration data, the process 300 determines that the threat is not applicable to the asset, and therefore the applicability score is the second value (e.g., two). If the process cannot determine whether the threat is applicable to the asset, for example, because applicability data or configuration data is not available, the applicability score is the first value (e.g., one).

In some implementations, the process 300 determines that a threat is applicable to an asset when the applicability data for the threat specifies a configuration that exactly matches the configuration of the asset. In other implementations, the process 300 determines that a threat is applicable to an asset when the configuration specified by the applicability data only partially matches the configuration of the asset. The configuration specified by the applicability data partially matches the configuration of the asset when some aspect of the configuration specified in the applicability data matches the configuration data for the asset, but some other aspect does not. For example, the process 300 can determine that the applicability data for a threat partially matches the configuration of an asset when the operating system targeted by the threat and the operating system running on the asset are in the same family, but not identical operating systems.

In some implementations, when the threat is represented by multiple threat vectors, each threat vector can have individual applicability data. In these implementations, the process 300 can determine individual applicability scores for each threat vector and then derive the applicability score from the individual applicability scores. For example, the process 300 can use the maximum individual applicability score, or the average individual applicability score, as the applicability score.

The process 300 determines an exposure factor E for the asset and the threat (304). The exposure factor E estimates the risk that an asset will be affected by the threat, and is derived from the threat factor T, a vulnerability score V, and a countermeasure score C. In some implementations, the exposure factor E is proportional to the threat factor T and the vulnerability score V and inversely proportional to the countermeasure score C. For example, the exposure factor can be calculated as follows:

$$E = \frac{TV}{C}.$$

The vulnerability score estimates whether the asset possesses a particular vulnerability. For vulnerabilities known to be exploited by a particular known threat, the vulnerability score can be further interpreted to estimate whether the asset is vulnerable to the associated threat. An asset is vulnerable to a threat when the asset is running software that has a known vulnerability that can be exploited by the threat, and the problem has not been patched or otherwise remediated. The vulnerability score, in principle, can represent the probability that the asset possesses the vulnerability. In some examples, the vulnerability score can have one of three pre-determined values: when the asset is vulnerable to the threat, the vulnerability score has a first value (e.g., one); when the asset is not vulnerable to the threat, the vulnerability score has a different second value (e.g., zero); and when it is unknown whether the asset is vulnerable to the threat, the vulnerability score has a different third value (e.g., one-half or some other value between zero and one and reflective of the probability of the vulnerability being present on an asset).

The process 300 determines whether the asset possesses a particular known vulnerability by analyzing the vulnerability detection data to determine whether any test whose outcome is included in the vulnerability detection data identified the asset as possessing the corresponding vulnerability. If so, the process 300 determines that the asset possesses the particular vulnerability, and the vulnerability score $V_P$ should have the first value (e.g., one). If not, the process 300 next analyzes the data to determine whether any test identified the asset as not possessing or being related to the vulnerability. If so, the process 300 determines that the asset does not possess the particular vulnerability, and the vulnerability score $V_P$ should have the second value (e.g., zero). Finally, if no test whose outcome is included in the vulnerability detection data identified the asset as possessing the particular known vulnerability, the process 300 determines that the asset's vulnerability is unknown, and that the vulnerability score should have the third value (e.g., one-half or some other value).

In some implementations, a given threat can exploit multiple vulnerabilities in the software of an asset. In these implementations, the process 300 can use the maximum value for the vulnerability score for each vulnerability as the vulnerability score. For example, if the threat could attack vulnerability A and vulnerability B of the asset, the vulnerability score for vulnerability A is one-half and the vulnerability score for vulnerability B is one, the process could use one as the vulnerability score for the asset. Other heuristics, for example, using the mean or median score, can alternatively be used. In some implementations, each possible exploitation of a vulnerability is represented as a separate threat vector.

The countermeasure score estimates a level of protection provided to the asset by any countermeasures protecting the asset. The process 300 selects the countermeasure score from a predetermined range, for example, from zero to ten. In some implementations, the countermeasure score is one of a discrete number of values within the range. For example, the countermeasure score can have a first value if the countermeasure(s) provide full mitigation, a different second value if the countermeasure(s) provide partial mitigation, and a different third value if the countermeasure(s) provide no mitigation or unknown mitigation.

To determine the appropriate countermeasure score for an asset and a threat, the system first determines what countermeasures for the threat are protecting the asset, and then determines the countermeasure score from protection scores for the countermeasures that are in place. In some implementations, the process 300 determines what countermeasures for the threat are in place from the threat definition data, and the countermeasure detection data, and determines whether an asset is protected by countermeasures for a vulnerability and/or threat by identifying the countermeasures for the threat specified in the threat definition data for the threat, and also identifying the countermeasures protecting the asset from the countermeasure detection data. The process 300 then determines whether any of the countermeasures for the threat are protecting the asset. As part of this determination, the process compares required settings of the countermeasures specified in the threat definition data to actual settings of the countermeasures specified in the countermeasure detection data.

If there are no countermeasures for the threat that are protecting the asset (or the asset's countermeasure state is unknown), the countermeasure score is assigned a value at the low-end of the predetermined range (e.g., zero from a range from zero to ten).

If there is at least one countermeasure for the threat that is protecting the asset, the system retrieves the protection score for each countermeasure from the threat definition data and calculates the countermeasure score from the protection scores.

In some implementations, the system uses the maximum of the protection scores as the countermeasure score for the asset. However, other calculations can also be used; for example, the system can use the mean or minimum of the protection scores.

In some implementations, the system further scales the countermeasure score so that it is consistent with the range of values used for the other scores. For example, if the threat severity is measured on a scale of zero to ten, and the countermeasure score ranges from zero to one-hundred, the system can scale the countermeasure score by dividing it by ten. In some implementations, the system converts a countermeasure score of zero to a countermeasure score of one, to avoid possible division by zero in the risk metric calculations.

The process 300 determines a risk metric for the asset and the threat from the exposure factor E and a criticality score A for the asset (306). In some implementations, the system determines the risk metric by multiplying the exposure factor E and the criticality score A, e.g., EA.

The criticality score represents an impact of losing an asset. In some implementations, the criticality of an asset is derived from a monetary value of an asset, e.g., an estimate of the monetary cost of replacing the asset. Alternatively or additionally, the criticality of an asset can be derived from a business value of the asset, e.g., an importance of the asset to the overall asset system. The criticality score can have a value in a predetermined range, e.g., from zero to ten. As another example, the criticality score can be selected from a set, such as a set $\{2, 4, 6, 8, 10\}$, where higher values indicate higher criticality.

The process 300 can determine the criticality score of an asset in various ways. In some implementations, users specify the criticality of individual assets, or groups of assets, for example, through a user interface. In some implementations, the assets in the system are represented in a hierarchical tree; in these implementations, a user can identify a group of assets by selecting a particular level in the hierarchy. All assets at the selected level or below the selected level in the hierarchy are considered a group, and can have a user-specified criticality. The user can specify a numerical value for the criticality score, or a criticality categorization (e.g., low, medium, high, extremely high) that is then mapped to a numerical value by the process 300.

In some implementations, users assign tags to individual assets, and then specify criticality for particular tags. For example, a user could tag some assets as mail servers and some assets as web servers, and then specify that mail servers have one criticality and web servers have a different criticality.

In some implementations, the process 300 determines the criticality of an asset from user-defined rules that specify how criticality should be determined. For example, users can specify that assets that are running a particular operating system and that have an IP address in a certain range should have one criticality, while assets in a different IP range should have a different criticality. In some implementations, the process 300 imports the criticality of the assets from a separate asset management system.

In some implementations, an asset can have multiple criticalities depending on how it is grouped. For example, an asset that is a mail server in a particular office in California can be grouped into one group because it is a mail server, another group because it is in the particular office in California, and another group because it is in North America. Assets can be grouped according to physical, logical, or user-specified criteria. An appropriate criticality can be selected given one or more rules maintained by the network monitor 102 or another system executing the process.

While the above describes particular combinations of scores to generate the threat factor and the exposure factor, fewer or more scores can also be used.

§3.2 Example Process for Vulnerability-Based Risk Metric Generation

Figure 3B:
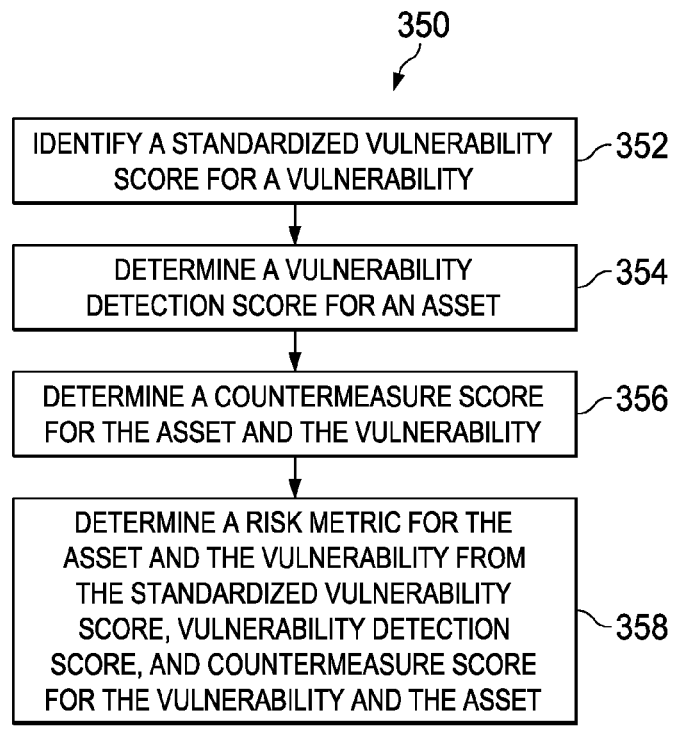
FIG. 3B is a flow diagram of an example process for generating a vulnerability-centric risk metric for an asset and a vulnerability.

FIG. 3B is a flow diagram of an example process 350 for generating a vulnerability-centric risk metric for an asset and a vulnerability. As noted above, some known vulnerabilities may not be associated with a known threat and consequently, threat-centric risk metrics may not consider the risk introduced to a system from one or more vulnerabilities not linked to a particular threat. Additionally, vulnerability-centric risk metrics can provide an additional context, supplementing threat-centric risk metrics described above, even when many of the vulnerabilities considered in the vulnerability-centric risk metric are also considered in a threat-centric risk metric. The process 350 can be implemented, for example, by the network monitor 102.

The process 350 identifies a standardized vulnerability score $V_S$ for a vulnerability (352). The standardized vulnerability score can have a generic base component score for the vulnerability, such as CVSS base B, and an environmental component that incorporates information concerning the respective criticality of an asset (or category or group of assets) and other asset-specific considerations (e.g., CVSS environmental metrics $X_{CDP}, X_{TD}, X_{CIA}$), thereby linking the vulnerability to particular assets or systems. In some implementations, standardized vulnerability score $V_S$ can be derived according to a standardized, third-party vulnerability scoring system, such as the Common Vulnerability Scoring System (CVSS). Indeed, in some instances, $V_S$ can be identified or be calculated from:

$$V_S = BX_T(X_{CDP}X_{TD}X_{cm}).$$

Environmental factors incorporated in standardized vulnerability score $V_S$ can incorporate environment and asset-specific factors (e.g., through $X_{CIA}$ incorporating environment- or asset-specific adjustments to the confidentiality, integrity, and availability). A resulting standardized vulnerability score $V_S$ can have a value in a pre-determined range of values. For example, standardized vulnerability score $V_S$ can have a value between 0 and 10.

In some implementations, an asset can possess multiple vulnerabilities that introduce similar or overlapping risk. Vulnerability definition data 205 can include indications of related vulnerabilities that should be considered in parallel with the vulnerability, so as to properly assess risk. Consequently, the process 350 can identify a standardized vulnerability score $V_S$ for each of a set of related or "overlapping" vulnerabilities and use the maximum individual standardized vulnerability score, or the average of the set's standardized vulnerability scores, as the standardized vulnerability score $V_S$.

The process can further derive a vulnerability detection score V identifying whether a particular vulnerability is possessed by, or applicable to, a particular asset (354). The vulnerability detection score estimates whether the asset possesses a particular vulnerability. For vulnerabilities known to be exploited by a particular known threat, the vulnerability score can be further interpreted to estimate whether the asset is vulnerable to the associated threat. Indeed, in such instances, vulnerability detection score V can be the same in both a threat-centric and vulnerability-centric risk metric generation. A vulnerability is applicable to or possessed by an asset when the asset is running software or utilizing hardware that is of a type that is associated with or otherwise evidences the vulnerability. For example, if a particular operating system has a known vulnerability, and an asset is running that operating system, the vulnerability is applicable to the asset. This is true regardless of whether the operating system on the asset has the vulnerability, or has been remediated to remove the vulnerability. The vulnerability detection score, in principle, can represent the probability that the asset possesses the vulnerability. In some examples, the vulnerability detection score can have one of three pre-determined values: when the asset is vulnerable to the threat, the vulnerability detection score has a first value (e.g., one); when the asset is not vulnerable to the threat, the vulnerability detection score has a different second value (e.g., zero); and when it is unknown whether the asset is vulnerable to the threat, the vulnerability detection score has a different third value (e.g., one-half or some other value between zero and one and reflective of the probability of the vulnerability being present on an asset). In some implementations, the vulnerability detection score can be any number between 0 and 1 reflecting a calculated probability that the asset possesses the vulnerability.

The process 350 determines whether the asset possesses a particular known vulnerability (and thereby the vulnerability detection score V) by analyzing the vulnerability detection data 206 and/or asset configuration data 207 to determine whether any test whose outcome is included in the vulnerability detection data identified the asset as possessing the corresponding vulnerability or configurations evidencing the vulnerability. If the process 350 affirmatively determines that the asset possesses the particular vulnerability, the vulnerability score $V_D$ should have the first value (e.g., one). If the process 350 affirmatively determines, through analysis of the data, that the tests reliably confirmed absence or irrelevance of the vulnerability for a particular asset, the vulnerability score $V_D$ should have the second value (e.g., zero). Finally, if no test whose outcome is included in the vulnerability detection data identified the asset as possessing the particular known vulnerability, or if conflicting or uncertain results are returned from the tests, the process 350 can determine that the asset's vulnerability is unknown or uncertain, and that the vulnerability score should have the third value (e.g., one-half or some other value between 0 and 1).

The process 350 determines a composite vulnerability score $V_C$ for the asset and the vulnerability (356). The composite vulnerability score $V_C$ estimates the potential risk a particular vulnerability poses to an asset and is derived from the standardized vulnerability score $V_S$ and the vulnerability detection score $V_D$. In some implementations, the composite vulnerability score $V_C$ is proportional to the standardized vulnerability score $V_S$ and the vulnerability detection score $V_D$. For example, the composite vulnerability score can be calculated as follows: $V_C = V_S V_D$. In instances where the standardized vulnerability score $V_S$ is a CVSS score, the composite vulnerability score can be further calculated as follows:

$$V_C = V_S V_D = V_{CVSS} V_D = B X_T (X_{CDP} X_{TD} X_{CIA}) V_D$$

The countermeasure score estimates a level of protection provided to the asset by any countermeasures protecting the asset. The process 350 selects, calculates, or otherwise determines a countermeasure score for a particular countermeasure's ability to protect a particular asset against a particular vulnerability. In some instances, the countermeasure score can be a value within a predetermined range, for example, from 0 to 10. In some implementations, the countermeasure score can be assigned one of a discrete number of values within the range. For example, the countermeasure score can have a first value if the countermeasure(s) provide full mitigation, a different second value if the countermeasure(s) provide partial mitigation, and a other values if the countermeasure(s) provide no mitigation or unknown mitigation, etc.

To determine the appropriate countermeasure score C for an asset and a vulnerability (356), the system first determines what countermeasures for the vulnerability are protecting the asset, and then determines the countermeasure score from protection scores for the countermeasures that are in place. In some implementations, the process 350 determines what countermeasures for the vulnerability are in place from the vulnerability definition data (e.g., 205) (and potentially also asset configuration data (e.g., 207)), and the countermeasure detection data (e.g., 208), and determines whether an asset is protected by countermeasures for a vulnerability and/or threat by identifying the countermeasures for the vulnerability specified in the vulnerability definition data for the vulnerability, and also identifying the countermeasures protecting the asset from the countermeasure detection data. The process 350 then determines whether any of the countermeasures for the vulnerability are protecting the asset. As part of this determination, the process compares settings of the countermeasures specified in the vulnerability definition data to actual settings of the countermeasures specified in the countermeasure detection data and/or asset configuration data.

In one example, if there are no countermeasures for the threat that are protecting the asset (or the asset's countermeasure state is unknown), the countermeasure score is assigned a value at the low-end of the predetermined range (e.g., zero from a range from zero to ten). If there is at least one countermeasure for the vulnerability that is protecting the asset, the system retrieves the protection score for each countermeasure from the vulnerability definition data and calculates the countermeasure score from the protection scores. In some implementations, the system uses the maximum of the protection scores as the countermeasure score for the asset. However, other calculations can also be used; for example, the system can use the mean or minimum of the protection scores.

In some implementations, the system further scales the countermeasure score so that it is consistent with the range of values used for the other scores, thereby normalizing a family of risk metrics calculated using the countermeasure score C. For example, if the threat severity is measured on a scale of zero to ten, and the countermeasure score ranges from zero to one-hundred, the system can scale the countermeasure score by dividing it by ten. In some implementations, the system converts a countermeasure score of zero to a countermeasure score of one, to avoid possible division by zero in the risk metric calculations.

As noted above, a particular countermeasure can be assigned a countermeasure score for a particular asset and a particular threat, as well as for the particular asset and a particular vulnerability. Further, in some implementations, countermeasure scores can incorporate or otherwise be based on a protection score, such as discussed above. In some instances, a countermeasure score for a particular countermeasure's protection of an asset can be the same for the particular countermeasure's protection of a threat and a related vulnerability. In other instances, a countermeasure score for the particular countermeasure's protection of the particular asset against the particular threat can have a value different from a countermeasure score for the same countermeasure's protection of the same asset against a vulnerability that is exploited by the particular threat (e.g., illustrating that the vulnerability exposes the asset to not only the particular threat, but potentially other threats), among other examples.

The process 350 determines a risk metric for the asset and the vulnerability from the composite vulnerability score $V_C$ and the countermeasure score C (358). In some implementations, the system determines the risk metric by dividing the composite vulnerability score $V_C$ by the countermeasure score C, such that the vulnerability-centric risk metric can be calculated as follows $$\frac{V_C}{C}.$$

In instances where a CVSS standardized vulnerability score is used, the vulnerability-centric risk metric can be calculated as:

$$\frac{B X_T (X_{CDP} X_{TD} X_{CIA}) V_D}{C}.$$

In some implementations, a particular asset can possess multiple vulnerabilities that are related and each contribute to a particular type of risk. For instance, multiple vulnerabilities can each expose a particular asset to a common threat and the risk facing the asset can be all or mostly attributed to this threat. As a result, in such an instance, it could be inaccurate to consider and aggregate vulnerabilities with overlapping risk. In some implementations, when overlapping vulnerabilities are identified (i.e., which contribute the same kind of risk), risk scores determined for the vulnerabilities can be averaged, the maximum risk score among the overlapping vulnerabilities, among other implementations.

§3.3 User Configuration of Risk Metric Generation

As noted above, a threat-centric and vulnerability-centric risk metric can both be generated for a particular asset. In some instances, even when all of the vulnerabilities facing an asset are also associated with a known threat, the respective threat-centric and vulnerability-centric risk metrics generated for the asset may nonetheless possess different values. Indeed, threat-centric and vulnerability-centric risk metrics can be considered two distinct contexts for measuring and assessing risk for an asset or system of assets and it can be useful to generate and compare the results generated in threat-centric and vulnerability-centric risk metrics for a particular asset, groups of assets, or system of assets to gain a more complete picture of the risks facing a system and how various assets, vulnerabilities, countermeasures, and threats contribute to such risk.

§3.4 User Configuration of Risk Metric Generation

In addition to permitting users to adopt either or both of a threat-centric or a vulnerability-centric approach to risk metric generation, in some implementations, the network monitor 102 allows a user to specify weights for one or more of the scores or factors used to generate the risk metric. For example, a user can specify that the criticality should be given a particular weight, can specify that the vulnerability should be given a particular weight, or can specify that the exposure factor should be given a particular weight. Users can specify weights for multiple scores or factors. Weights of zero effectively remove a score or factor from the risk metric calculation. Users can also use the weights to increase the effect of a score or factor, or to decrease the effect of a score or factor.

In some implementations, when the network monitor 102 allows users to use weights, the network monitor rebalances the resulting risk metric so that it is in the same range as an unweighted risk metric would have been. For example, if a user specified that the asset criticality should be given a weight of 2, the network monitor 102 would divide the resulting metric by 2.

In some implementations, users can specify different weights for different categories of threats, vulnerabilities, or assets. For example, a user could specify a first weight for threats that attack assets running one specific type of operating system, and could specify a different second weight for threats that attack assets running a different type of operating system.

§4.0 Example Processes for Aggregating Risk Metrics

Section 3 described calculating a threat-centric risk metric for an individual asset and an individual threat and calculating a vulnerability-centric risk metric for an individual asset and an individual vulnerability. However, system administrators, and other users, often want to gain an overall view of their systems. Therefore, aggregating the risk metrics on a per-threat basis, per-vulnerability basis, a per-asset basis, and/or per-asset group basis allows the network monitor to provide such a function. These aggregate metrics can help system administrators determine which metrics, which vulnerabilities, and which threats, pose the most serious problems for a system. Each of these aggregate risk metrics is described in more detail below.

§5.1 Example Process for Aggregating Risk Metrics on a Per-Threat Basis

As noted above, risk metrics can be aggregated on a per-threat or per-vulnerability basis. FIG. 4 is a flow diagram of an example process 400 for aggregating risk metrics for assets on a per-vulnerability basis. The process can be implemented, for example, by the network monitor 102. While FIG. 4 illustrates aggregating vulnerability-centric risk metrics on a per-vulnerability basis, similar techniques can be used to aggregate threat-centric risk metrics on a per-threat basis.

The process 400 receives risk metrics for assets for a particular vulnerability (402). The risk metrics can be for all assets in a system of assets, or for all assets in a particular group of assets. Examples of asset groups are described above. The risk metrics for each asset for the particular vulnerability can be calculated, for example, as described above with reference to FIG. 3B.

The process calculates an aggregate risk metric for the particular vulnerability from the risk metrics for the assets for the particular vulnerability (404).

In some implementations, the aggregate risk metric is a sum of the risk metrics for the assets for the vulnerability, e.g.

$$\sum_n \frac{V_{C_n}}{C_n},$$

where n is the number of assets in the considered group, and $V_{C_n}$ and $C_n$ are calculated as described above with reference to FIG. 3B for asset n.

The sum of the risk metrics is not range-bound; in other words, the sums for different assets will not necessarily be on the same scale. Therefore, in some implementations, other aggregate metrics that are range bound, such as maximum or mean, are used instead of the sum. For example, in other implementations, the aggregate risk metric is the mean risk metric for assets to which the vulnerability is applicable, calculated by dividing the sum of the risk metrics for each asset to which the vulnerability is applicable and the particular vulnerability by the number of assets to which the vulnerability is applicable. This division bounds the mean risk score to the same range of values that the individual risk metrics for the particular vulnerability and the assets have.

As another example, in other implementations, the aggregate risk metric is the maximum risk metric from the risk metrics for assets to which the particular vulnerability is applicable and the particular vulnerability.

Other aggregate risk metrics, for example, median or mode, can also be used. In some implementations, the system generates multiple aggregate risk metrics for the particular vulnerability. In some implementations, the system calculates the mean, median, mode, maximum, and minimum of the risk metrics for assets to which the particular vulnerability is applicable and the particular threat, and then generates an overall risk metric by using the resulting values as input to a metric function. In some implementations, the function is derived through trial and error, where different structures of the function, and different coefficients of the function, are tested with experimental data, until an acceptable function is determined. Conventional techniques for selecting the coefficients of the function can be used, for example, regression spline and mathematical optimization.

§5.2 Example Process for Aggregating Risk Metrics on a Per-Asset Basis

FIG. 5 is a flow diagram of an example process 500 for aggregating risk metrics on a per-asset basis. The process can be implemented, for example, by the network monitor 102 and can be applied to either threat-centric risk metrics or vulnerability-centric metrics for an asset. While for simplicity, process 500 is described with reference to vulnerability-centric metrics for an asset, similar principles can be applied for threat-centric risk metrics.

The process receives risk metrics for a particular asset for each of several vulnerabilities (502). The risk metrics for each asset for the particular vulnerability can be calculated, for example, as described above with reference to FIG. 3B.

The process calculates an aggregate risk metric for the particular asset from the risk metrics for the asset and each of the several vulnerabilities (504). In some implementations, the aggregate risk metric is a sum of the risk metrics for the asset for the vulnerabilities, e.g.

$$\sum_m \frac{V_{C_m}}{C_m},$$

where m is the number of vulnerabilities that are applicable to the asset, and $V_{C_n}$ and $C_n$ are calculated as described above with reference to FIG. 3B for threat m.

The sum of the risk metrics may not be range-bound; in other words, the sums for different assets will not necessarily be on the same scale. Therefore, in some implementations, other aggregate metrics that are range bound, such as maximum or mean, are used instead of the sum. For example, in other implementations, the aggregate risk metric is the mean risk metric for vulnerabilities that are applicable to the asset. The mean risk metric is calculated by dividing the sum of the risk metrics for the asset and vulnerabilities that are applicable to the asset by the number of vulnerabilities that are applicable to the asset. This division bounds the mean risk score to the same range of values that the individual risk metrics for the particular vulnerability and the assets have.

As another example, in other implementations, the aggregate risk metric is the maximum risk metric from the risk metrics for the asset and vulnerabilities that are applicable to the asset.

Other aggregate risk metrics, for example, median or mode, can also be used. In some implementations, the system generates multiple aggregate risk metrics for the particular vulnerability. In some implementations, the system calculates the mean, median, mode, maximum, and minimum of the risk metrics for assets to which the particular vulnerability is applicable and the particular threat, and then generates an overall risk metric by using the resulting values as input to a metric function.

§5.3 Example Process for Aggregating Risk Metrics on an Asset Group Basis

In some implementations, the network monitor 102 aggregates the risk metrics for groups of assets. The assets can be grouped, for example, as described above. The system can then calculate the aggregate risk metric for each asset in the group and combine the aggregate risk metrics using various statistical techniques, e.g., mean, maximum, mean, median, mode, or minimum.

§6.0 Example Uses of Risk Metrics

Once the network monitor 102 calculates the risk metrics, and aggregated risk metrics, as described above, the risk metrics and aggregated risk metrics can be used in various ways. In some implementations, the network monitor 102 allows users to view assets, vulnerabilities, or threats, sorted by the aggregate risk metric for the asset, vulnerability, or threat. For example, the network monitor 102 can list all assets, vulnerabilities, or threats, sorted by aggregate risk metric, or can list a top number, e.g., top ten, of the assets, vulnerabilities, or threats. Ranking assets, vulnerabilities, and/or threats according to aggregate risk scores allows a user to quickly identify which assets are most at risk, or which vulnerabilities and threats are most dangerous for a system. The user can then remediate the most at-risk assets before remediating other less-at-risk assets, or can apply remediations across the system for the riskiest vulnerabilities and threats before applying remediations for other, less-risky ones.

As one particular example, FIG. 6 is an example user interface 600 presenting the top ten most at-risk assets according to the aggregate risk metric for the assets. The user interface lists the names of the assets 602, sorted by aggregate risk metric as well as the aggregate risk metrics 604 themselves. The user interface can optionally include additional information about the assets. For example, in FIG. 6, the last date the asset was patched 606 is shown. Other information about the asset can alternatively, or additionally, be displayed in the user interface. In some implementations, a user can click on the name of an asset to be provided with additional information about the asset.

The aggregate risk metrics for assets and threats can be used in other ways. For example, in some implementations, users can set rules that associate particular aggregate risk metrics with particular actions. For example, a user can specify that if an aggregate risk metric for any vulnerability or threat rises above a specified threshold, the user should be alerted. Similarly, a user can specify that if an aggregate risk metric for any asset rises above a specified threshold, the user should be alerted. The user can also use rules to filter what data the user views. For example, the user can request to only view information for assets, vulnerabilities, or threats, having an aggregate risk metric above a specified threshold. In some implementations, the network monitor 102 receives queries from users specifying a particular risk metric range, identifies assets, vulnerabilities, or threats satisfying the query, and presents the identified assets, vulnerabilities, or threats to the user.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. At least one machine accessible, non-transitory storage medium having instructions stored thereon, the instructions when executed on a machine, cause the machine to:
   receive vulnerability definition data, using a hardware processor, including, for each of a plurality of vulnerabilities, an indication of the vulnerability, an identification of one or more countermeasures that reduce a risk associated with possession of the vulnerability by an asset, an indication of a level of protection potentially afforded by each countermeasure for the vulnerability, and applicability information describing one or more configurations of assets to which the vulnerability applies;
   receive vulnerability detection data, countermeasure detection data, and configuration data for each of one or more assets, wherein the vulnerability detection data for each asset identifies vulnerabilities applicable to the asset, the countermeasure detection data for each asset identifying one or more countermeasures protecting the asset, and the configuration data for each asset describes a configuration of the asset; and
   determine a respective risk metric for each of the one or more assets for each of the one or more vulnerabilities, wherein determining the risk metric includes, for each asset and each vulnerability:
      identifying a standardized vulnerability score for the vulnerability, wherein the standardized vulnerability score indicates a relative level of risk associated with the vulnerability relative to other vulnerabilities in the plurality of vulnerabilities;
      determining a vulnerability detection score for the asset from the vulnerability detection data for the asset;
      determining a vulnerability composite score for the particular asset to the particular vulnerability, wherein the vulnerability composite score is derived from the standardized vulnerability score and the vulnerability detection score;
      determining a countermeasure component score from the vulnerability definition data and the countermeasure detection data, wherein determining the countermeasure component score includes analyzing the level of protection afforded by each countermeasure identified in both the vulnerability definition data for the vulnerability and in the countermeasure data as protecting the asset; and
      determining the risk metric for the asset and the vulnerability from the vulnerability composite score and the countermeasure component score.

2. The non-transitory storage medium of claim 1, wherein the standardized vulnerability score includes a standardized component and an environmental component adjusting the standardized component to features of a particular system including the asset.

3. The non-transitory storage medium of claim 2, wherein the environmental component represents, at least in part, criticality of the asset within the particular system.

4. The non-transitory storage medium of claim 3, wherein the environmental component is derived based on criticality information for the asset, wherein the criticality information defining an impact of losing the asset.

5. The non-transitory storage medium of claim 2, wherein each of the standardized component and environmental component include data describing a confidentiality impact to assets based on the vulnerability, an integrity impact to assets based on the vulnerability, and an availability impact to assets based on the vulnerability.

6. The non-transitory storage medium of claim 2, wherein the standardized component includes a temporal component reflecting changes to risk posed by the vulnerability over time.

7. The non-transitory storage medium of claim 2, wherein the standardized vulnerability score is based, at least in part, on the standard score of the Common Vulnerability Scoring System (CVSS).

8. The non-transitory storage medium of claim 1, wherein the countermeasure component score is derived from at least the countermeasure protection data and the countermeasure detection data.

9. The non-transitory storage medium of claim 8, wherein the countermeasure component score is further derived from the configuration data for the asset.

10. The non-transitory storage medium of claim 8, wherein identifying the countermeasure component score includes calculating the countermeasure component score.

11. The non-transitory storage medium of claim 7, wherein the vulnerability detection score is derived from at least the vulnerability detection data.

12. The non-transitory storage medium of claim 10, wherein the vulnerability detection score is further derived from the configuration data for the asset.

13. The method of claim 1, wherein the determined risk metric for the asset is a vulnerability-centric risk metric, the method further comprising determining a threat-centric risk metric for the asset, wherein determining a threat-centric risk metric for the asset includes:
   determining a threat factor for the asset and particular threat, wherein the threat factor is derived from a threat severity score estimating a severity of the particular threat and an applicability score estimating the applicability of the particular threat to the asset;
   determining a threat exposure factor for the asset and the particular threat, wherein the threat exposure factor is derived from the threat factor, a vulnerability component score, and a threat countermeasure component score, wherein the vulnerability component score indicates whether the asset is vulnerable to the particular threat, and the countermeasure component score is derived from an estimate of a likelihood that a second countermeasure will mitigate the effect of an attack on the asset relating to the particular threat; and
   wherein the threat-centric risk metric for the asset and the particular threat is determined from the threat exposure factor and a criticality score for the asset, wherein the criticality score represents an impact of losing the asset.

14. The method non-transitory storage medium of claim 13, wherein the threat takes advantage of the vulnerability, the vulnerability component score is equal to the vulnerability detection score, and the countermeasure is the second countermeasure.

15. The non-transitory storage medium of claim 14, wherein respective calculated values of the determined vulnerability-centric metric and threat-centric metric are different.

16. The non-transitory storage medium of claim 1, wherein the standardized vulnerability score has a value within a predefined range.

17. The non-transitory storage medium of claim 1, wherein the standardized countermeasure component score has a value within a predefined range.

18. The non-transitory storage medium of claim 1, wherein at least one or more vulnerabilities in the plurality of known vulnerabilities are associated with at least one in a plurality of known threats, and the vulnerability is not associated with any of the plurality of known threats.

19. A method comprising:
receiving vulnerability definition data, using a hardware processor, including, for each of a plurality of vulnerabilities, an indication of the vulnerability, an identification of one or more countermeasures that reduce a risk associated with possession of the vulnerability by an asset, an indication of a level of protection potentially afforded by each countermeasure for the vulnerability, and applicability information describing one or more configurations of assets to which the vulnerability applies;
receiving vulnerability detection data, countermeasure detection data, and configuration data for each of one or more assets, wherein the vulnerability detection data for each asset identifies vulnerabilities applicable to the asset, the countermeasure detection data for each asset identifying one or more countermeasures protecting the asset, and the configuration data for each asset describes a configuration of the asset; and
determining a respective risk metric for each of the one or more assets for each of the one or more vulnerabilities, wherein determining the risk metric includes, for each asset and each vulnerability:
identifying a standardized vulnerability score for the vulnerability, wherein the standardized vulnerability score indicates a relative level of risk associated with the vulnerability relative to other vulnerabilities in the plurality of vulnerabilities;
determining a vulnerability detection score for the asset from the vulnerability detection data for the asset;
determining a vulnerability composite score for the asset to the vulnerability, wherein the vulnerability composite score is derived from the standardized vulnerability score and the vulnerability detection score;
determining a countermeasure component score from the vulnerability definition data and the countermeasure detection data, wherein determining the countermeasure component score includes analyzing the level of protection afforded by each countermeasure identified in both the vulnerability definition data for the vulnerability and in the countermeasure data as protecting the asset; and
determining the risk metric for the asset and the vulnerability from the vulnerability composite score and the countermeasure component score.

20. The method of claim 19, further comprising:
determining a respective risk metric for the asset and each of the plurality of vulnerabilities; and
determining an aggregate risk metric for the asset from the respective risk metrics for the asset and each of the plurality of vulnerabilities.

21. The method of claim 20, wherein the aggregate risk metric is one of: a sum of the respective risk metrics, a mean of the respective risk metrics, a maximum of the respective risk metrics, a minimum of the respective risk metrics, or a mode of the respective risk metrics.

22. The method of claim 20, further comprising:
selecting a group of assets including the asset;
determining an aggregate risk metric for each asset in the group of assets; and
determining an aggregate risk metric for the group of assets from the aggregate risk metric for each asset in the group of assets.

23. The method of claim 19, further comprising:
determining a respective risk metric for each of a plurality of assets and the vulnerability; and
determining an aggregate risk metric for the vulnerability from the respective risk metrics for each of the plurality of assets and the vulnerability.

24. The method of claim 19, wherein the risk metric is a vulnerability-centric risk metric and the method further comprises:
receiving threat definition data, the threat definition data including, for each of a plurality of threats, an identification of the threat, an identification of one or more countermeasures that reduce a risk that the threat will affect an asset, protection data describing a protection score for each countermeasure for the threat, and applicability data describing one or more configurations of assets to which the threat applies; and
determining a respective threat-centric risk metric, the determining including, for each asset and each threat:
determining an applicability score for the asset and the threat from the applicability data and the configuration data, wherein the applicability score has a first applicability value when the threat is applicable to the configuration of the asset and a different second applicability value when the threat is not applicable to the configuration of the asset;
determining a vulnerability score for the asset and the threat from the vulnerability detection data for the asset;
determining a countermeasure score from the threat definition data and the countermeasure detection data, wherein the generating comprises analyzing the protection score for each countermeasure that is both identified in the threat definition data for the threat and identified in the countermeasure data as protecting the asset, wherein the countermeasure score has a value within a predefined range; and
determining the threat-centric risk metric for the particular asset for the particular threat from the applicability score, the vulnerability score, and the countermeasure score.

25. The method of claim 24, further comprising:
determining a respective vulnerability-centric risk metric for the asset and each of the plurality of vulnerabilities;
determining an aggregate vulnerability-centric risk metric for the asset from the respective risk metrics for the asset and each of the plurality of vulnerabilities;
determining a respective threat-centric risk metric for the asset and each of the plurality of threats; and
determining an aggregate threat-centric risk metric for the asset from the respective risk metrics for the asset and each of the plurality of threats.

26. A system comprising:
at least one processor device;
at least one memory element, communicatively coupled to the processor device; and
a network monitor, adapted when executed by the at least one processor device to:
receive vulnerability definition data, using a hardware processor, including, for each of a plurality of vulnerabilities, an indication of the vulnerability, an identification of one or more countermeasures that reduce a risk associated with possession of the vulnerability by an asset, an indication of a level of protection potentially afforded by each countermeasure for the vulnerability, and applicability information describing one or more configurations of assets to which the vulnerability applies;

receive vulnerability detection data, countermeasure detection data, and configuration data for each of one or more assets, wherein the vulnerability detection data for each asset identifies vulnerabilities applicable to the asset, the countermeasure detection data for each asset identifying one or more countermeasures protecting the asset, and the configuration data for each asset describes a configuration of the asset; and determine a respective risk metric for each of the one or more assets for each of the one or more vulnerabilities, wherein determining the risk metric includes, for each asset and each vulnerability:

identifying a standardized vulnerability score for the vulnerability, wherein the standardized vulnerability score indicates a relative level of risk associated with the vulnerability relative to other vulnerabilities in the plurality of vulnerabilities;

determining a vulnerability detection score for the asset from the vulnerability detection data for the asset;

determining a vulnerability composite score for the particular asset to the particular vulnerability, wherein the vulnerability composite score is derived from the standardized vulnerability score and the vulnerability detection score;

determining a countermeasure component score from the vulnerability definition data and the countermeasure detection data, wherein determining the countermeasure component score includes analyzing the level of protection afforded by each countermeasure identified in both the vulnerability definition data for the vulnerability and in the countermeasure data as protecting the asset; and determining the risk metric for the asset and the vulnerability from the vulnerability composite score and the countermeasure component score.

* * * * *

UNITED STATES PATENT AND TRADEMARK OFFICE
CERTIFICATE OF CORRECTION

PATENT NO. : 8,595,845 B2
APPLICATION NO. : 13/354181
DATED : November 26, 2013
INVENTOR(S) : Prasanna Ganapathi Basavapatna et al.

Page 1 of 1

It is certified that error appears in the above-identified patent and that said Letters Patent is hereby corrected as shown below:

On the Title page, in item (56), in column 2, under "Other Publications", line 2,
delete "Niwor," and insert -- Niwot, --, therefor.

In the Claims:

In column 30, line 26, in claim 13, delete "method" and
insert -- non-transitory storage medium --, therefor.

In column 30, line 50, in claim 14, after "The" delete "method".

Signed and Sealed this
Eighteenth Day of February, 2014

Michelle K. Lee
*Deputy Director of the United States Patent and Trademark Office*